United States Patent
Kuranoshita et al.

(10) Patent No.: US 9,760,317 B2
(45) Date of Patent: Sep. 12, 2017

(54) PAGE ALLOCATION TABLE DETERMINING APPARATUS, PAGE ALLOCATION TABLE DETERMINING METHOD, AND NON-TRANSITORY STORAGE MEDIUM STORING PAGE ALLOCATION TABLE DETERMINING PROGRAM

(71) Applicant: FUJIFILM Corporation, Tokyo (JP)

(72) Inventors: Masashi Kuranoshita, Tokyo (JP); Kyouta Watanabe, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/668,316

(22) Filed: Mar. 25, 2015

(65) Prior Publication Data
US 2015/0277812 A1    Oct. 1, 2015

(30) Foreign Application Priority Data

Mar. 26, 2014  (JP) ................. 2014-062859

(51) Int. Cl.
*G06F 15/00*  (2006.01)
*G06F 3/12*  (2006.01)

(52) U.S. Cl.
CPC .......... *G06F 3/1208* (2013.01); *G06F 3/1204* (2013.01); *G06F 3/1252* (2013.01); *G06F 3/1256* (2013.01); *G06F 3/1282* (2013.01); *G06F 3/1205* (2013.01)

(58) Field of Classification Search
CPC combination set(s) only.
See application file for complete search history.

(56) References Cited

U.S. PATENT DOCUMENTS

2013/0259606 A1* 10/2013 Kayama ............... G06F 3/1205 412/9
2013/0342857 A1* 12/2013 Burke, Jr. ............ H04N 1/603 358/1.9

FOREIGN PATENT DOCUMENTS

| JP | 11-110453 A | 4/1999 |
| JP | 2000-148744 A | 5/2000 |
| JP | 2000-326472 A | 11/2000 |
| JP | 2003-270771 A | 9/2003 |
| JP | 2013206158 A | 10/2013 |

OTHER PUBLICATIONS

Communication dated Feb. 16, 2016, from the Japanese Patent Office in counterpart application No. 2014-062859, 6 pages in Japanese and English.

(Continued)

*Primary Examiner* — Helen Q Zong
(74) *Attorney, Agent, or Firm* — Sughrue Mion, PLLC

(57) ABSTRACT

If a page allocation table determining apparatus receives a change, either in the content of items in a page allocation table screen that is displayed by a display unit, or in the plotted content of an imposition screen, which is displayed by the display unit in response to an action taken by the user, the page allocation table determining apparatus generates a page allocation table screen and an imposition screen that simultaneously reflect such a change. Based thereon, the display unit simultaneously displays the page allocation table screen, which simulates the page allocation table, and the imposition screen, which simulates a layout of imposed pages.

5 Claims, 12 Drawing Sheets

(56) References Cited

OTHER PUBLICATIONS

Communication, dated Sep. 10, 2015, issued in corresponding EP Application No. 15159667.3, 6 pages in English.
"Preps Imposition Software Version 6.1 User Guide," Jun. 16, 2010, Eastman Kodak Company, XP055210002.
Communication pursuant to Article 94(3) EPC, dated Oct. 17, 2016, issued in corresponding EP Application No. 15 159 667.3, 8 pages in English.
Communication dated May 24, 2017 from the European Patent Office in counterpart Application No. 15159667.3.

* cited by examiner

FIG. 4

NEW JOB

JOB ID  1000
JOB TEMPLATE  New Default
JOB NAME  New Job
DELIVERY DATE
CUSTOMER ID
REMARKS

GENERATE JOB
EDIT PAGE ALLOCATION TABLE

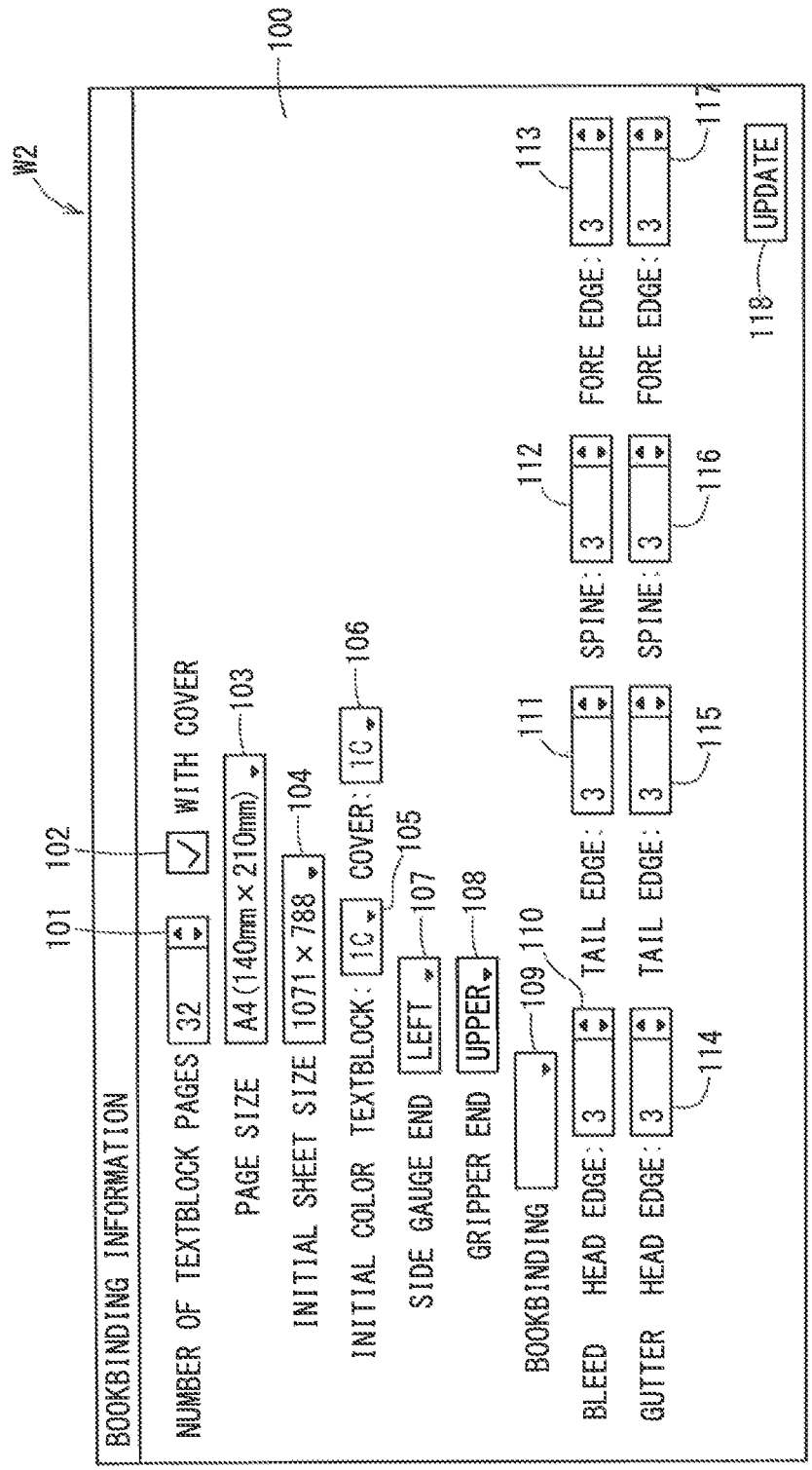

FIG. 6

| | | | | PAGE ALLOCATION TABLE | | | |
|---|---|---|---|---|---|---|---|
| | All | | WF1 | WF2 | | WF3 | |
| PAGE | PAGE NUMBER | COLOR | PAPER TYPE | SIZE | SIGNATURE | SHEET | |
| 1 | — | 1C | COATED PAPER | 1071×788 | 1 | 1 | |
| 2 | — | 1C | COATED PAPER | 1071×788 | 1 | 1 | |
| 3 | 1 | 1C | COATED PAPER | 1071×788 | 2 | 2 | |
| 4 | 2 | 1C | COATED PAPER | 1071×788 | 2 | 2 | |
| 5 | 3 | 1C | COATED PAPER | 1071×788 | 2 | 2 | |
| 6 | 4 | 1C | COATED PAPER | 1071×788 | 2 | 2 | |
| 7 | 5 | 1C | COATED PAPER | 1071×788 | 2 | 2 | |
| 8 | 6 | 1C | COATED PAPER | 1071×788 | 2 | 2 | |
| 9 | 7 | 1C | COATED PAPER | 1071×788 | 2 | 2 | |
| 10 | 8 | 1C | COATED PAPER | 1071×788 | 2 | 2 | |
| 11 | 9 | 1C | COATED PAPER | 1071×788 | 2 | 2 | |
| 12 | 10 | 1C | COATED PAPER | 1071×788 | 2 | 2 | |
| 13 | 11 | 1C | COATED PAPER | 1071×788 | 2 | 2 | |
| 14 | 12 | 1C | COATED PAPER | 1071×788 | 2 | 2 | |
| 15 | 13 | 1C | COATED PAPER | 1071×788 | 2 | 2 | |
| 16 | 14 | 1C | COATED PAPER | 1071×788 | 2 | 2 | |
| 17 | 15 | 1C | COATED PAPER | 1071×788 | 2 | 2 | |
| 18 | 16 | 1C | COATED PAPER | 1071×788 | 2 | 2 | |
| 19 | 17 | 1C | COATED PAPER | 1071×788 | 3 | 3 | |
| 20 | 18 | 1C | COATED PAPER | 1071×788 | 3 | 3 | |

FIG. 12

PAGE ALLOCATION TABLE EDITING

BOOKBINDING SETTINGS | OK

PAGE ALLOCATION TABLE

| PAGE | PAGE NUMBER | COLOR | PAPER TYPE | SIZE | SIGNATURE | SHEET |
|---|---|---|---|---|---|---|
| 3 | 1 | 1C | COATED PAPER | 636×469 | 2 | 2 |
| 4 | 2 | 1C | COATED PAPER | 636×469 | 2 | 2 |
| 5 | 3 | 1C | COATED PAPER | 636×469 | 2 | 2 |
| 6 | 4 | 1C | COATED PAPER | 636×469 | 2 | 2 |
| 7 | 5 | 1C | COATED PAPER | 636×469 | 3 | 3 |
| 8 | 6 | 1C | COATED PAPER | 636×469 | 3 | 3 |
| 9 | 7 | 1C | COATED PAPER | 636×469 | 3 | 3 |
| 10 | 8 | 1C | COATED PAPER | 636×469 | 3 | 3 |
| 11 | 9 | 1C | COATED PAPER | 636×469 | 4 | 4 |
| 12 | 10 | 1C | COATED PAPER | 636×469 | 4 | 4 |
| 13 | 11 | 1C | COATED PAPER | 636×469 | 4 | 4 |
| 14 | 12 | 1C | COATED PAPER | 636×469 | 4 | 4 |
| 15 | 13 | 1C | COATED PAPER | 636×469 | 5 | 5 |
| 16 | 14 | 1C | COATED PAPER | 636×469 | 5 | 5 |
| 17 | 15 | 1C | COATED PAPER | 636×469 | 5 | 5 |
| 18 | 16 | 1C | COATED PAPER | 636×469 | 5 | 5 |

IMPOSITION

PAGE ALLOCATION TABLE DETERMINING APPARATUS, PAGE ALLOCATION TABLE DETERMINING METHOD, AND NON-TRANSITORY STORAGE MEDIUM STORING PAGE ALLOCATION TABLE DETERMINING PROGRAM

CROSS-REFERENCE TO RELATED APPLICATION

This application is based upon and claims the benefit of priority from Japanese Patent Application No. 2014-062859 filed on Mar. 26, 2014, the contents of which are incorporated herein by reference.

BACKGROUND OF THE INVENTION

Field of the Invention

The present invention relates to a page allocation table determining apparatus and a page allocation table determining method for determining a page allocation table that is representative of the configuration of pages of a print. The present invention further concerns a non-transitory storage medium that stores a program for enabling a computer to function as a means for determining a page allocation table.

Description of the Related Art

Recently, in the field of printing, printing processes have been digitized in their entirety, thanks to the widespread use of desktop publishing (DTP) and computer-to-plate (CTP) technologies. For example, a technique has been proposed for electronically generating and editing page allocation tables, which are representative of the configuration of pages of prints (see Japanese Laid-Open Patent Publication No. 2003-270771).

Japanese Laid-Open Patent Publication No. 2000-148744 and Japanese Laid-Open Patent Publication No. 11-110453 disclose techniques for displaying not only a page allocation table, but also an imposition image that shows the layout of imposed pages based on the page allocation table. More specifically, Japanese Laid-Open Patent Publication No. 2000-148744 states in paragraphs [0057] through [0059] that a page allocation table screen and an imposition screen are displayed while enabling switching therebetween in response to prescribed instructions.

SUMMARY OF THE INVENTION

Persons that work in production departments (downstream processes) of printing companies are often capable of specifically imagining a layout of imposed pages from the content of a page allocation table. Conversely, such persons can easily deduce the content of a page allocation table from the layout of imposed pages. On the other hand, there are more than a few people that work in sales and planning departments (upstream processes) within the company who are not skillful at producing page allocation tables, even though they may be knowledgeable individually concerning page allocation tables and layouts of imposed pages.

However, according to the techniques disclosed in Japanese Laid-Open Patent Publication No. 2003-270771, Japanese Laid-Open Patent Publication No. 2000-148744 and Japanese Laid-Open Patent Publication No. 11-110453, it is difficult to intuitively grasp a correlation between page allocation tables and layouts of imposed pages. Therefore, the disclosed techniques are not handy for users who are not skilled at handling page allocation tables.

An object of the present invention is to provide a page allocation table determining apparatus and a page allocation table determining method, which are capable of assisting users who are not skilled at handling page allocation tables in producing page allocation tables. A further object of the present invention is to provide a non-transitory storage medium that stores a program for determining a page allocation table.

According to the present invention, a page allocation table determining apparatus is provided, including a bookbinding information acquirer for acquiring bookbinding information concerning the form of a bound book, a screen generator for generating a page allocation table screen, which simulates a page allocation table having a format identified according to the bookbinding information acquired by the bookbinding information acquirer, and an imposition screen, which simulates a layout of imposed pages based on the page allocation table, and a display unit for simultaneously displaying the page allocation table screen and the imposition screen that are generated by the screen generator. If the screen generator receives a change, either in the content of items in the page allocation table screen displayed by the display unit, or in the plotted content of the imposition screen displayed by the display unit in response to an action taken by the user, the screen generator generates a page allocation table screen and an imposition screen that simultaneously reflect the change.

As described above, if the screen generator receives a change, either in the content of items in a page allocation table screen displayed by the display unit, or in the plotted content of an imposition screen displayed by the display unit in response to an action taken by the user, the screen generator generates a page allocation table screen and an imposition screen that simultaneously reflect the change. In this case, the display unit simultaneously displays the page allocation table screen and the imposition screen that simultaneously reflect the change. Therefore, by viewing the page allocation table and the layout of imposed pages at once, the user is capable of intuitively grasping a correlation between the page allocation table and the layout of imposed pages, and of sequentially grasping the change made in the page allocation table and the layout of imposed pages. Consequently, the user can be assisted in producing a page allocation table, even if the user is not skilled at handling page allocation tables.

The screen generator preferably generates a page allocation table, which simulates a page allocation table representing a subformat that is a subset of the format.

The screen generator preferably generates the page allocation table representing the subformat made up of at least two key items indicating the type, weight, size, or thickness of a print medium, a color channel, or a type of parts.

The page allocation table determining apparatus preferably further includes a page allocation table generator for acquiring the content of items displayed by the display unit, and generating table data representing the page allocation table.

According to the present invention, a page allocation table determining method also is provided, for enabling a computer to perform the steps of acquiring bookbinding information concerning the form of a bound book, generating a page allocation table screen, which simulates a page allocation table having a format identified according to the acquired bookbinding information, and an imposition screen, which simulates a layout of imposed pages based on the page allocation table, and simultaneously displaying the page allocation table screen and the imposition screen that are generated. In the above step of generating, if a change, either in the content of items in the displayed page allocation table screen, or in the plotted content of the displayed imposition screen, is received in response to an action taken by the user, a page allocation table screen and an imposition screen are generated that simultaneously reflect the change.

According to the present invention, a non-transitory storage medium further is provided in which a page allocation table determining program is stored for enabling a computer to perform the steps of acquiring bookbinding information concerning the form of a bound book, generating a page allocation table screen, which simulates a page allocation table having a format identified according to the acquired bookbinding information, and an imposition screen, which simulates a layout of imposed pages based on the page allocation table, and simultaneously displaying the page allocation table screen and the imposition screen that are generated. In the above step of generating, if a change, either in the content of items in the displayed page allocation table screen, or in the plotted content of the displayed imposition screen, is received in response to an action taken by the user, a page allocation table screen and an imposition screen are generated that simultaneously reflect the change.

According to the present invention, as described above, if a change, either in the displayed content of items in a page allocation table screen, or in the plotted content of the displayed imposition screen, is received in response to an action taken by the user, a page allocation table screen and an imposition screen are generated and displayed that simultaneously reflect the change. Therefore, by viewing the page allocation table and the layout of imposed pages at once, the user is capable of intuitively grasping a correlation between the page allocation table and the layout of imposed pages, and of sequentially grasping the change made in the page allocation table and the layout of imposed pages. Consequently, the user can be assisted in producing a page allocation table, even if the user is not skilled at handling page allocation tables.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is an image diagram showing a first input screen;

FIG. 5 is an image diagram showing a second input screen;

FIG. 6 is an image diagram showing a page allocation table screen;

FIG. 12 is a fourth transition diagram of the page allocation table editing screen.

DESCRIPTION OF THE PREFERRED EMBODIMENTS

A page allocation table determining method according to a preferred embodiment of the present invention, in relation to a page allocation table determining apparatus for carrying out the page allocation table determining method, and a non-transitory storage medium in which a page allocation table determining program is stored, will be described in detail below with reference to the accompanying drawings.

[Overall Configuration of Print Production System 10]

Figure 1:
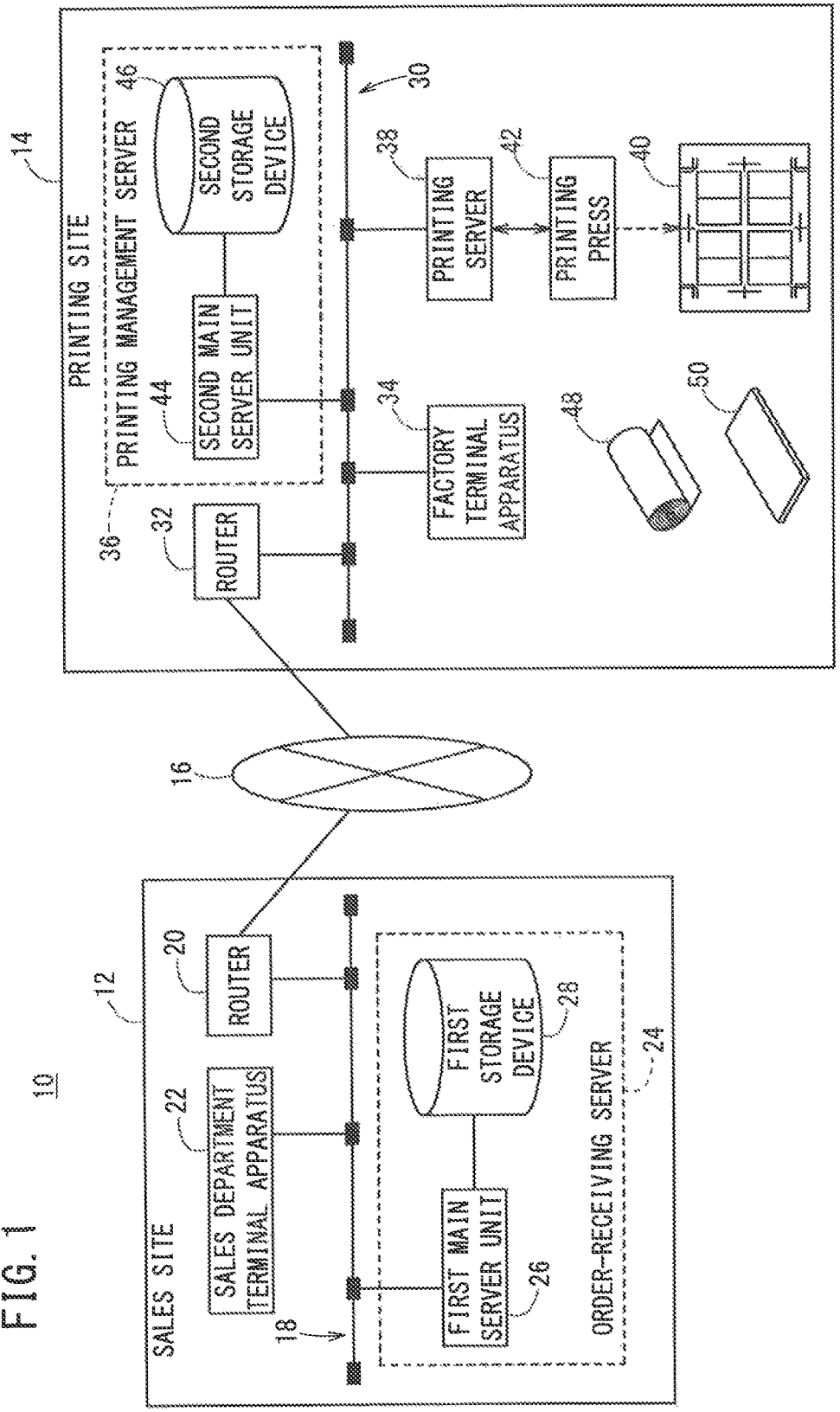
FIG. 1 is a block diagram showing an overall configuration of a print production system incorporating a sales department terminal apparatus as a page allocation table determining apparatus according to an embodiment of the present invention.

FIG. 1 shows in block form the overall configuration of a print production system 10 incorporating a sales department terminal apparatus 22 as a page allocation table determining apparatus according to an embodiment of the present invention.

As shown in FIG. 1, the print production system 10 is a system including a sales site 12, which is administered by the sales department of a printing company, and a printing site 14, which is administered by the production department of the printing company. The sales site 12 and the printing site 14 are interconnected through a network 16 such as a local area network (LAN) or a wide area network (WAN).

The sales site 12 includes a router 20 serving as a device that provides a connection between the network 16 and a LAN 18 established in the sales site 12, a sales department terminal apparatus 22 that is operated by a salesperson, and an order-receiving server 24 for managing ordering information concerning various prints including a print 40. The sales department terminal apparatus 22 and the order-receiving server 24 are connected for communication with each other via the LAN 18.

The order-receiving server 24 is a management information system (MIS) server for sequentially managing ordering information and management information concerning the printing company. As shown in FIG. 1, the order-receiving server 24 includes a first main server unit 26, and a first storage device 28 that is connected to the first main server unit 26.

The first storage device 28 stores various pieces of management information, including received orders, sales, sales activities, estimates, annual production plans, monthly production plans, weekly and daily production plans, warehousing and shipping, inventories, stock purchasing, and costs, etc., for example.

The printing site 14 includes a router 32 serving as a device that provides a connection between the network 16 and a LAN 30 established in the printing site 14, a factory terminal apparatus 34 operated by production personnel, a printing management server 36 for managing print jobs, a printing server 38 for performing raster image processing (RIP) on imposed platemaking data, and a printing press 42 for producing a print 40 on the basis of printing data supplied from the printing server 38. The factory terminal apparatus 34, the printing management server 36, and the printing server 38 are connected for communication with each other via the LAN 30.

The printing management server 36 is a core device for work flow management in the print production system 10. As shown in FIG. 1, the printing management server 36 includes a second main server unit 44, and a second storage device 46 that is connected to the second main server unit 44. The second storage device 46 stores content data, output data (e.g., platemaking data, printing plate data, or proof data), job tickets (e.g., job definition format (JDF) files), color profiles, and color sample data, etc.

The printing press 42 produces a print 40 that is made up of images printed on a print medium 48. The print medium 48 may comprise a paper medium such as synthetic paper, thick paper, aluminum-evaporated paper, or the like, a resin medium such as vinyl chloride, polyethylene terephthalate (PET), or the like, or tarpaulin paper, metal sheeting, or the like.

If the printing press 42 comprises a proofer, then the printing press 42 may comprise a direct digital color proofer (DDCP), an ink jet color proofer, a low-resolution color laser printer (electrophotographic printer), an ink jet printer, or the like.

If the printing press 42 comprises a letterpress printing press, then the printing press 42 produces a print 40, which includes images printed on a print medium 48, by applying inks to the print medium 48 through printing plates 50 and non-illustrated intermediate transfer members.

If the printing press 42 comprises a digital printing press, then the printing press 42 can directly produce a print 40 without the need for generating printing plates 50. Such a digital printing press may comprise an ink jet printing press, a wide-format printing press, an ink jet color proofer, a color laser printer, or the like.

[Electric Setup of Sales Department Terminal Apparatus 22]

Figure 2:
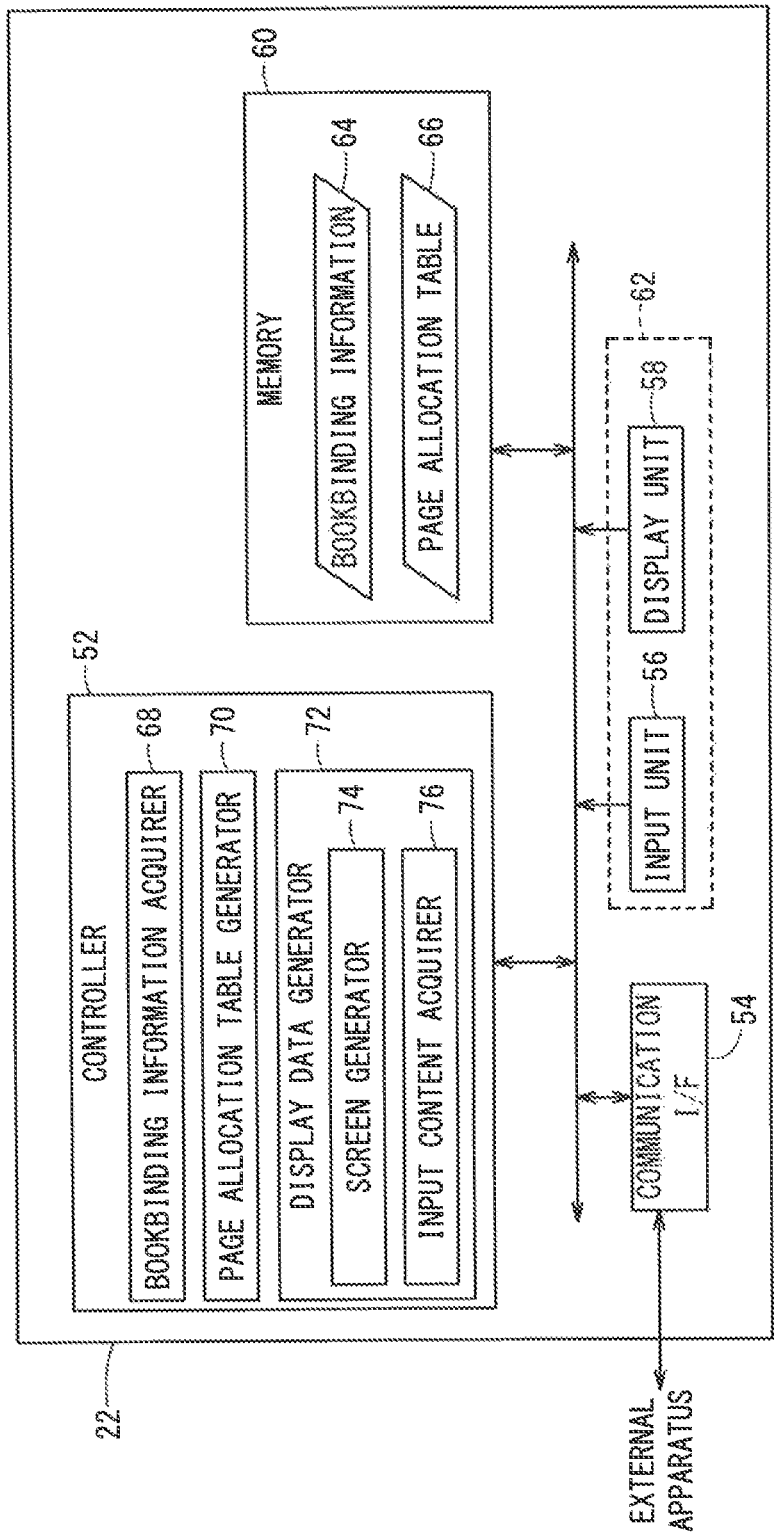
FIG. 2 is an electric block diagram of the sales department terminal apparatus shown in FIG. 1.

FIG. 2 shows in electric block form the sales department terminal apparatus 22 shown in FIG. 1. As shown in FIG. 2, the sales department terminal apparatus 22 basically comprises a computer having a controller 52, a communication interface (I/F) 54, an input unit 56, a display unit 58, and a memory 60 (storage medium).

The communication I/F 54 serves as an interface for sending electric signals to and receiving electric signals from an external apparatus. The sales department terminal apparatus 22 can acquire various data, e.g., bookbinding information 64, from the order-receiving server 24 (FIG. 1) through the communication I/F 54. The sales department terminal apparatus 22 also is capable of supplying various data, e.g., a page allocation table 66, to the order-receiving server 24 through the communication I/F 54.

The input unit 56 comprises various input devices including a mouse, a track ball, a keyboard, and a touch sensor, etc. The display unit 58 is an output device based on any of various principles, which may include a liquid crystal display panel, an organic electroluminescence (EL) display panel, and a cathode-ray tube (CRT). The input function of the input unit 56 and the display function of the display unit 58 are combined with each other, thereby making up a user interface 62 for allowing the user to input parameter values while viewing currently displayed content.

The memory 60 stores programs and data required for the controller 52 to control various components of the sales department terminal apparatus 22. As shown in FIG. 2, the memory 60 stores bookbinding information 64 as information concerning bookbinding details, e.g., the form of a bound book, together with a page allocation table 66 as table data representing a page allocation table.

The memory 60 may comprise a non-transitory computer-readable storage medium. The computer-readable storage medium comprises a portable medium such as a magnetooptic disk, a ROM, a CD-ROM, a flash memory, or the like, or a storage medium such as a hard disk or the like incorporated in a computer system. The storage medium may also include a medium for dynamically holding programs for a short period of time, or a medium for holding programs for a certain period of time.

The controller 52 comprises an information processing unit, i.e., a processor, such as a central processing unit (CPU) or the like. The controller 52 reads and executes programs stored in the memory 60 to thereby carry out various functions, including a bookbinding information acquirer 68 for acquiring the bookbinding information 64, a page allocation table generator 70 for generating the page allocation table 66, and a display data generator 72, which includes a screen generator 74 and an input content acquirer 76, for generating display data based on which a window W1 (FIG. 4), a window W2 (FIG. 5), and a window W3 (FIGS. 8 through 12) are displayed.

[Operation of Sales Department Terminal Apparatus 22]

Figure 3:
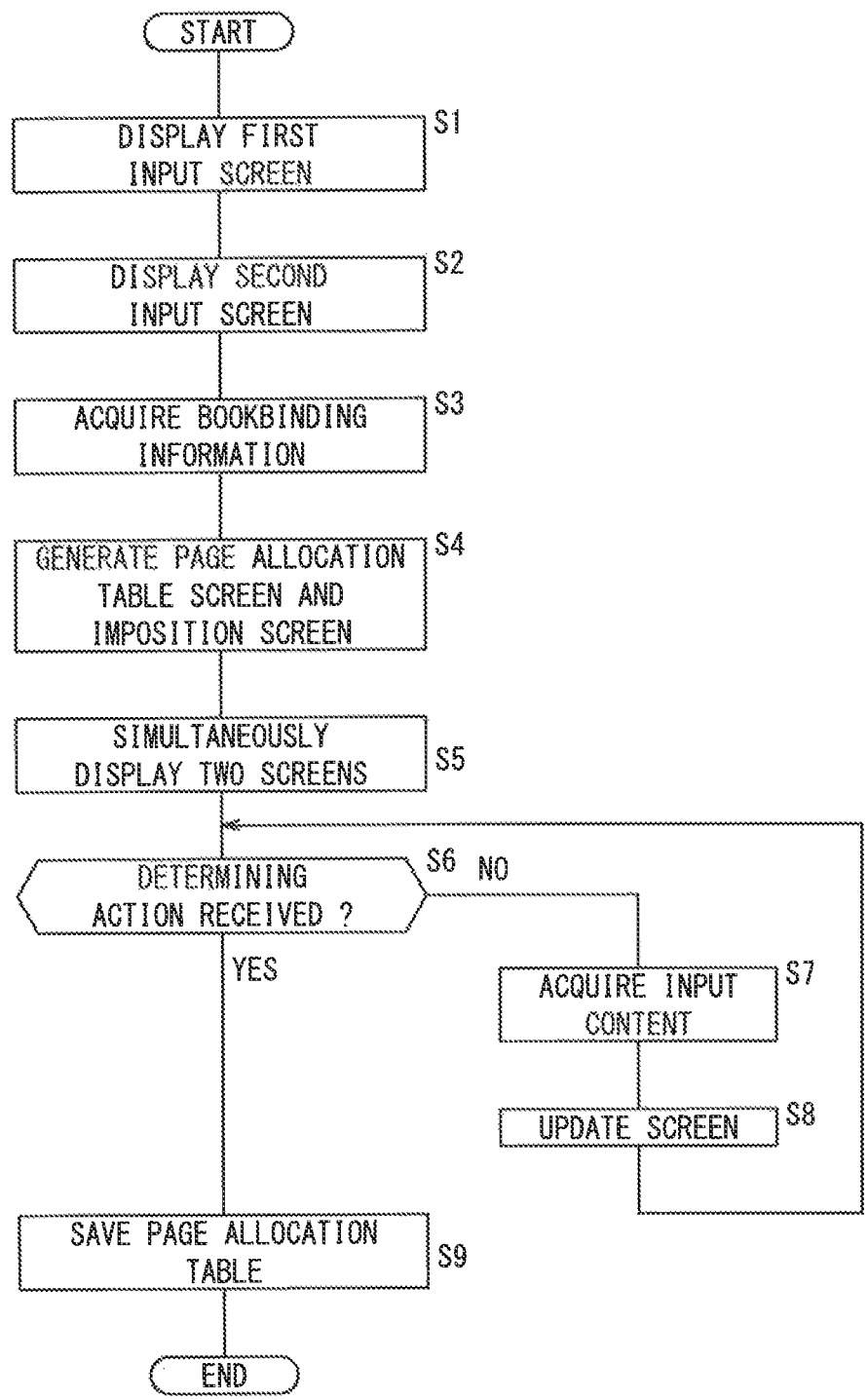
FIG. 3 is a flowchart of an operation sequence of the sales department terminal apparatus shown in FIGS. 1 and 2.

The sales department terminal apparatus 22, which functions as the page allocation table determining apparatus according to the present embodiment, is configured as described above. Next, operations of the sales department terminal apparatus 22 shown in FIG. 2 will be described in detail below primarily with reference to the flowchart shown in FIG. 3.

In step S1, the sales department terminal apparatus 22 displays a first input screen 80 (see FIG. 4) with respect to generation of a new print job on the display unit 58. More specifically, before the first input screen 80 is displayed, the screen generator 74 generates display data for a window W1 (including the first input screen 80) and outputs the generated display data to the display unit 58, which displays the window W1 including the first input screen 80.

As shown in FIG. 4, the first input screen 80 includes six user control boxes 81 through 86, a button 87 marked "GENERATE JOB", and a button 88 marked "EDIT PAGE ALLOCATION TABLE".

The user control box 81, which corresponds to "JOB ID", allows the user to input identifying information (specifically, a numeral) of a print job. The user control box 82, which corresponds to "JOB TEMPLATE", allows the user to input a template (specifically, a template name to be called) for the print job. The user control box 83, which corresponds to "JOB NAME", allows the user to input the name of the print job.

The user control box 84, which corresponds to "DELIVERY DATE", allows the user to input the delivery date (e.g., year, month, day) for the print 40. The user control box 85, which corresponds to "CUSTOMER ID", allows the user to input the identifying information (in any format) for the customer. The user control box 86, which corresponds to "REMARKS", allows the user to input remarks concerning the print job.

The operator of the sales department terminal apparatus 22, i.e., the user, enters various settings through the user control boxes 81 through 86 by operating the input unit 56 (FIG. 2). In a case where the controller 52 receives a clicking action on the "EDIT PAGE ALLOCATION TABLE" button 88 on the first input screen 80, the controller 52 proceeds to the next step S2.

In step S2, the sales department terminal apparatus 22 displays on the display unit 58 a second input screen 100 (see FIG. 5) with respect to basic settings for a bookbinding format. More specifically, before the second input screen 100 is displayed, the screen generator 74 generates display data for a window W2 (including the second input screen 100) and outputs the generated display data to the display unit 58, which displays the window W2 including the second input screen 100.

As shown in FIG. 5, the second input screen 100 includes seventeen user control boxes 101 through 117, and a button 118 marked "UPDATE".

The user control box 101, which corresponds to "NUMBER OF TEXTBLOCK PAGES", allows the user to input a number (more specifically, a numeral) of textblock pages of a bound book. The user control box 102, which corresponds to "WITH COVER", allows the user to input whether or not there is a cover. The user control box 103, which corresponds to "PAGE SIZE", allows the user to input the page size (e.g., A4 size). The user control box 104, which corresponds to "INITIAL SHEET SIZE", allows the user to input an initial value (e.g., in units of mm) for the sheet size.

The user control boxes 105 and 106, which correspond to "INITIAL COLOR", allow the user to input initial values (e.g., "1C" for monochrome and "4C" for colors) with respect to "TEXTBLOCK PAGES" and "COVER". The user control box 107, which corresponds to "SIDE GAUGE END", allows the user to input a side gauge alignment position (e.g., "LEFT" or "RIGHT"). The user control box 108, which corresponds to "GRIPPER END", allows the user to input a gripper alignment position (e.g., "UPPER" or "LOWER"). The user control box 109, which corresponds to "BOOKBINDING", allows the user to input a bookbinding process (e.g., "COLLATING").

The user control boxes 110 through 113, which correspond to "BLEED", allow the user to input initial values (e.g., in units of mm) for bleed sizes with respect to "HEAD EDGE", "TAIL EDGE", "SPINE", and "FORE EDGE". The user control boxes 114 through 117, which correspond to "GUTTER", allow the user to input initial values (e.g., in units of mm) for gutter sizes with respect to "HEAD EDGE", "TAIL EDGE", "SPINE, and "FORE EDGE".

The operator (i.e., the user) of the sales department terminal apparatus 22 enters various settings through the user control boxes 101 through 117 by operating the input unit 56 (FIG. 2). If the controller 52 receives a clicking action on the "UPDATE" button 118 on the second input screen 100, the controller 52 proceeds to the next step S3.

In step S3, the bookbinding information acquirer 68 acquires bookbinding information 64, which is required to identify the format of a page allocation table to be generated. More specifically, the bookbinding information acquirer 68 acquires as bookbinding information 64 values that are input and set through the user control boxes 101 through 106 and 109 on the second input screen 100 (FIG. 5). Alternatively, as part of the bookbinding information 64, the bookbinding information acquirer 68 may acquire ordering information that is managed by the order-receiving server 24.

Figure 7:
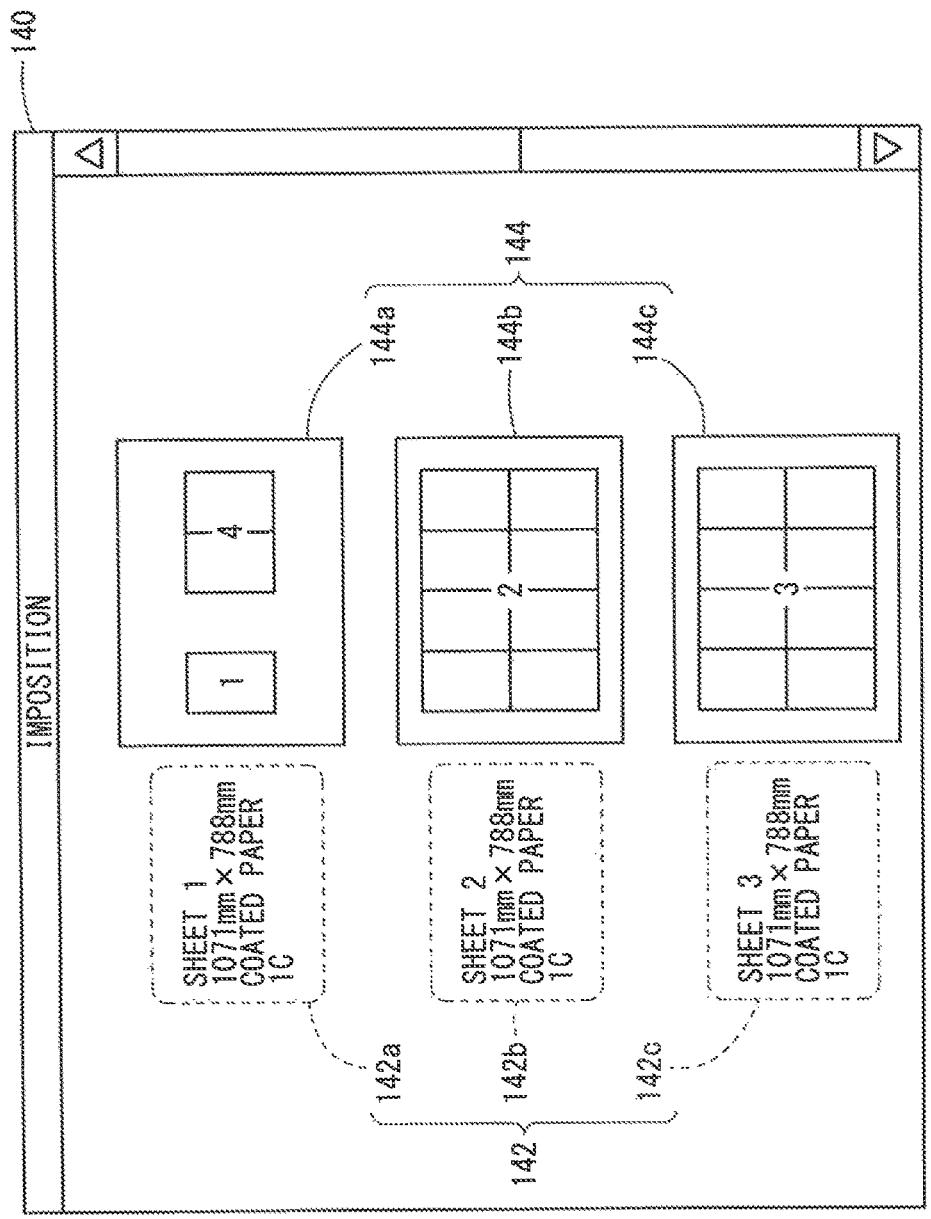
FIG. 7 is an image diagram showing an imposition screen.

In step S4, on the basis of the bookbinding information 64 acquired in step S3, the screen generator 74 identifies the format and initial values of a page allocation table, and generates a page allocation table screen 120 (FIG. 6) and an imposition screen 140 (FIG. 7). The page allocation table screen 120 is a screen that simulates a page allocation table having a format identified according to the bookbinding information 64. The imposition screen 140 is a screen that simulates a layout of imposed pages based on the page allocation table.

FIG. 6 is an image diagram showing the page allocation table screen 120. As shown in FIG. 6, the page allocation table screen 120 principally is composed of a page allocation table image 122 for the print 40 (FIG. 1). The page allocation table screen 120 includes a tab 124, which is positioned above the page allocation table image 122, for displaying the content of the page allocation table image 122 while enabling switching thereof.

The page allocation table image 122 includes a plurality of lines, each of which displays the content of items with respect to one page. More specifically, each line is made up of a small field 126 that indicates a page identification number ("PAGE" in FIG. 6), a small field 127 that indicates a page number, a small field 128 that indicates a color channel ("COLOR" in FIG. 6), a small field 129 that indicates the type of the print medium 48 ("PAPER TYPE" in FIG. 6), a small field 130 that indicates the size of the print medium 48 ("SIZE" in FIG. 6), a small field 131 that indicates a signature identification number ("SIGNATURE" in FIG. 6), and a small field 132 that indicates a sheet identification number ("SHEET" in FIG. 6).

The types and number of the items that make up the page allocation table screen 120 are not limited to those shown in FIG. 6, but may be changed appropriately as needed. Other types of items that may be added include the weight (generally, basis weight or ream weight) of the print medium 48, the thickness of the print medium 48, and the types of parts (textblock and cover) of the book.

FIG. 7 is an image diagram showing the imposition screen 140. As shown in FIG. 7, the imposition screen 140 includes character information 142 representing a portion of the imposition information, and a layout image 144 schematically indicating a page layout. The character information 142 includes content representing "SHEET", "SIZE", "PAPER TYPE", and "COLOR", which are arranged successively from above.

In FIG. 7, the imposition screen 140 shows imposition information for three sheets including a cover (one sheet) and a textblock (two sheets). Stated otherwise, the character information 142 is made up of auxiliary information 142a concerning "SHEET 1", auxiliary information 142b concerning "SHEET 2", and auxiliary information 142c concerning "SHEET 3". Further, the layout image 144 is made up of an auxiliary image 144a concerning "SHEET 1", an auxiliary image 144b concerning "SHEET 2", and an auxiliary image 144c concerning "SHEET 3".

In step S5, the sales department terminal apparatus 22 simultaneously displays on the display unit 58 the page allocation table screen 120 and the imposition screen 140 respectively generated in step S4. More specifically, before the page allocation table screen 120 and the imposition screen 140 are displayed, the display data generator 72 generates display data for a window W3 (including a page allocation table editing screen 150), and then outputs the generated display data to the display unit 58, which displays the window W3 including the page allocation table editing screen 150.

The display data generated by the screen generator 74 may be image data generated according to application software. Alternatively, the display data may be replaced with various parameters, which enable a graphic function of an application programming interface (API) provided by basic software.

Figure 8:
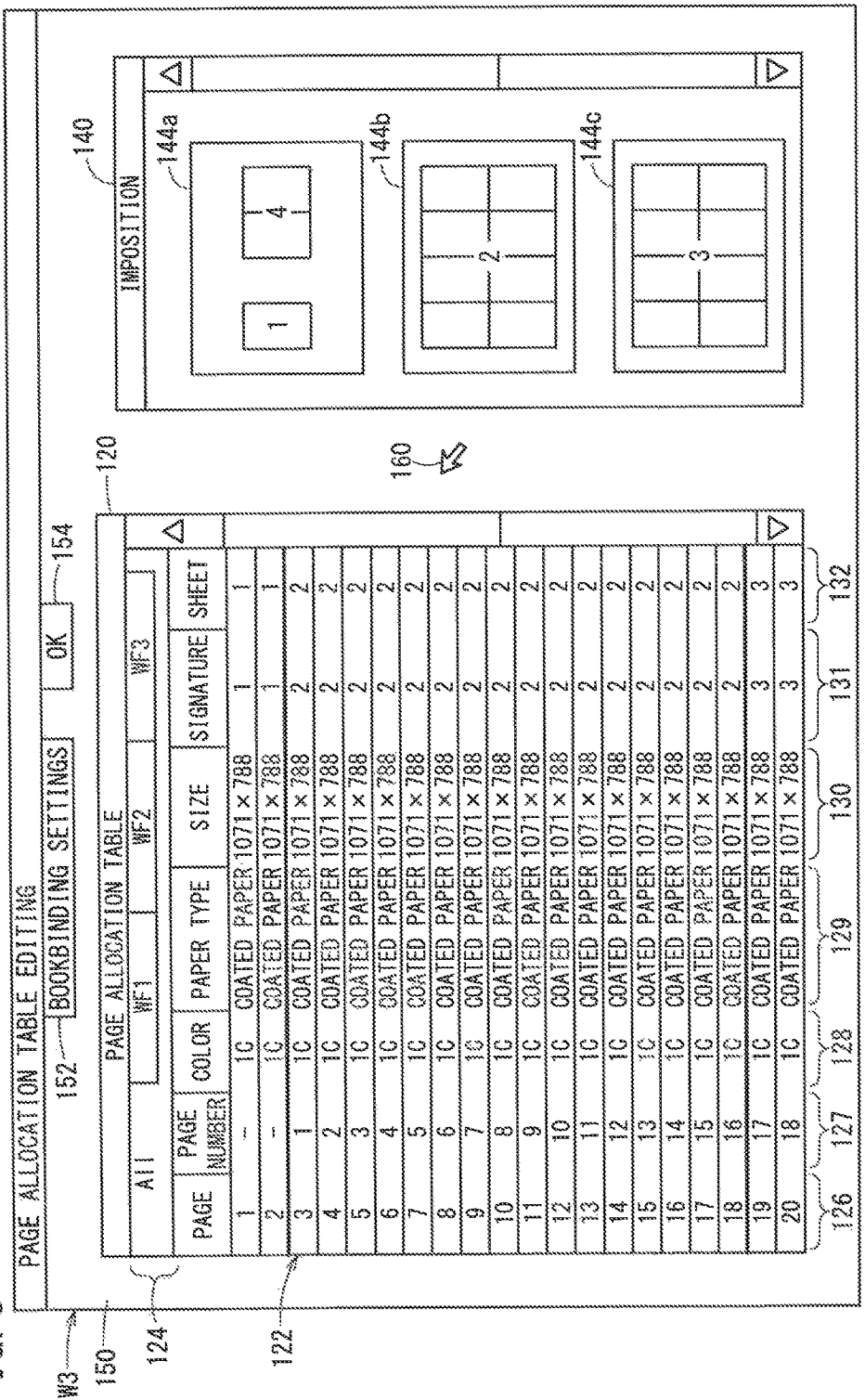
FIG. 8 is an image diagram showing a page allocation table editing screen.

As shown in FIG. 8, the page allocation table editing screen 150 includes, in addition to the page allocation table screen 120 shown in FIG. 6 and the imposition screen 140 shown in FIG. 7, a tab 152 marked "BOOKBINDING SETTINGS" and a tab 154 marked "OK". It should be noted that the character information 142 on the imposition screen 140 is omitted from illustration in FIG. 8 and in FIGS. 9 through 12, to be described later.

As shown in FIG. 8, the page allocation table screen 120 and the imposition screen 140 are displayed in a horizontally juxtaposed fashion on the page allocation table editing screen 150. The content of the items in the page allocation table screen 120 match with the plotted content of the imposition screen 140. Stated otherwise, the layout of the imposed pages that is represented by the imposition screen 140 can be determined from the page allocation table that is represented by the page allocation table screen 120. In addition, the page allocation table that is represented by the page allocation table screen 120 can be determined from the layout of imposed pages that is represented by the imposition screen 140.

In step S6, the controller 52 assesses whether or not an action to determine the content of the items of the page allocation table has been received. More specifically, the controller 52 assesses whether or not a clicking action on the "OK" tab 154 on the page allocation table editing screen 150 has been received. If the controller 52 assesses that no clicking action (step S6: NO) has been received, control proceeds to the next step S7.

In step S7, the input content acquirer 76 acquires the present input content of the page allocation table editing screen 150. At this time, insofar as the displayed content of the page allocation table screen 120 and the imposition screen 140 match each other, the input content acquirer 76 may acquire either one or both of the content of the items or the plotted content.

In step S8, according to the input content obtained in step S7, the sales department terminal apparatus 22 updates the page allocation table editing screen 150. More specifically, the screen generator 74 newly generates a page allocation table screen 120, in which the content of the items of the page allocation tables are updated, and an imposition screen 140, in which the plotted content of the layout of imposed pages are updated. The sales department terminal apparatus 22 then displays the page allocation table editing screen 150, in which such changed input content are reflected.

Thereafter, control returns to step S6, and steps S6 through S8 are repeated until the controller 52 receives an action to determine the content of the items in the page allocation table. With reference to FIGS. 9 through 12, a specific process of editing the page allocation table editing screen 150 will be described below by way of example.

Using the user interface 62, the operator moves a cursor 160 (see FIG. 8) to a position where the auxiliary image 144b is present. The screen generator 74 then generates a new page allocation table screen 120 and a new imposition screen 140 (see FIG. 9), which indicate that "SHEET 2" corresponding to the auxiliary image 144b has been selected.

Figure 9:
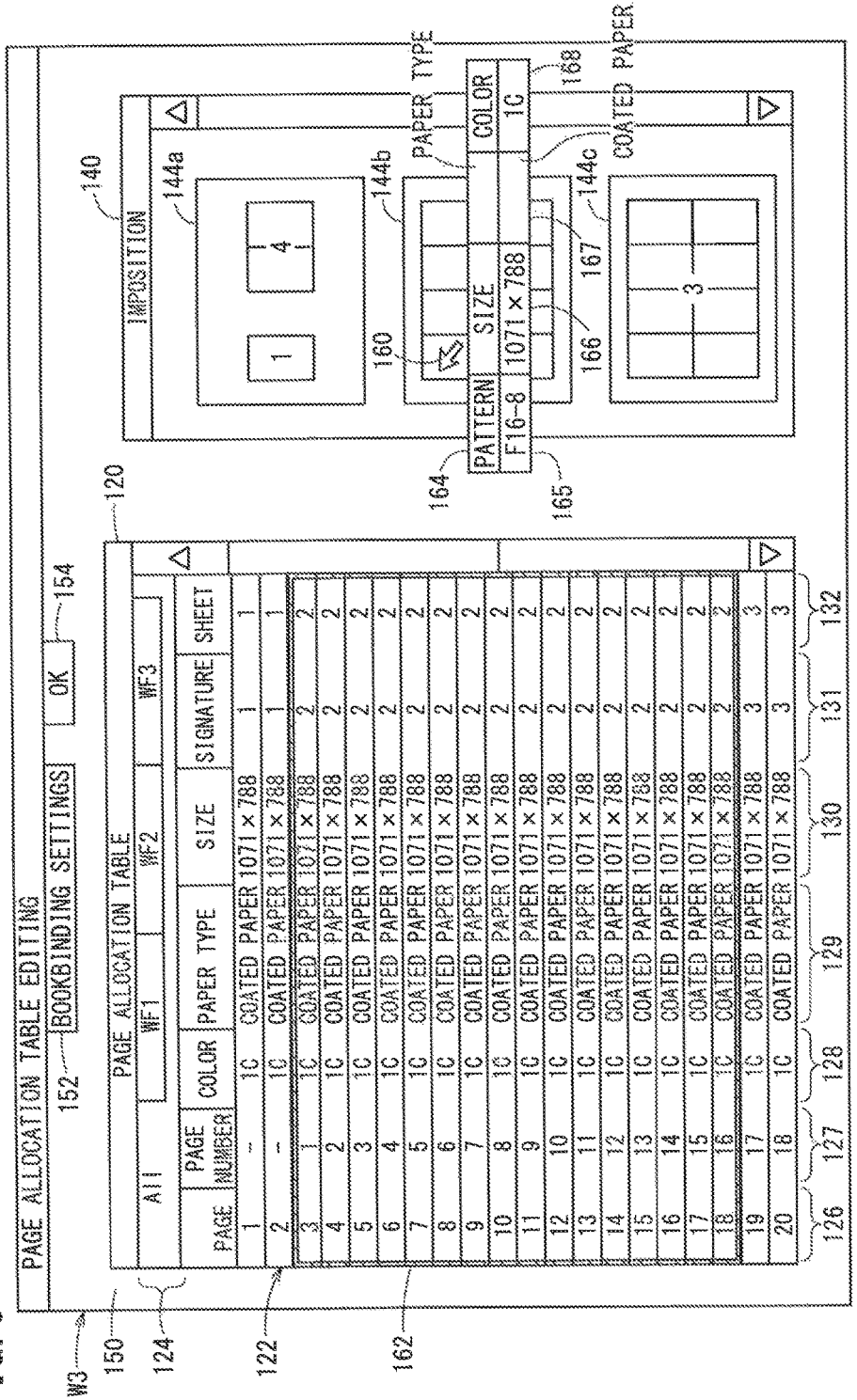
FIG. 9 is a first transition diagram of the page allocation table editing screen.

As shown in FIG. 9, the plotted content of the new page allocation table screen 120 and the new imposition screen 140 differ in part from the plotted content of the page allocation table screen 120 and the imposition screen 140 shown in FIG. 8. More specifically, the page allocation table image 122 of the page allocation table screen 120 includes a visually highlighted particular area 162 partially therein. The particular area 162 covers sixteen lines where the content of the items of the small field 132 represent "SHEET 2". Thus, the operator can grasp at a glance that "SHEET 2" is currently selected by viewing the page allocation table screen 120.

A menu box 164 for changing the layout of imposed pages on "SHEET 2" is displayed in overlapping relation to the auxiliary image 144b on the imposition screen 140. The menu box 164 includes, arranged successively from the left, pull-down menus 165, 166, 167, 168 for selecting "(IMPO-SITION) PATTERN", "SIZE", "PAPER TYPE", and "COLOR".

Using the user interface 62, the operator moves the cursor 160 to the position of the pull-down menu 167, and then drags the cursor 160 to select "UNCOATED". Accordingly, the screen generator 74 generates a new page allocation table screen 120 and a new imposition screen 140 (see FIG. 10), which indicate that "UNCOATED" has been selected as representing the paper type of "SHEET 2".

Figure 10:
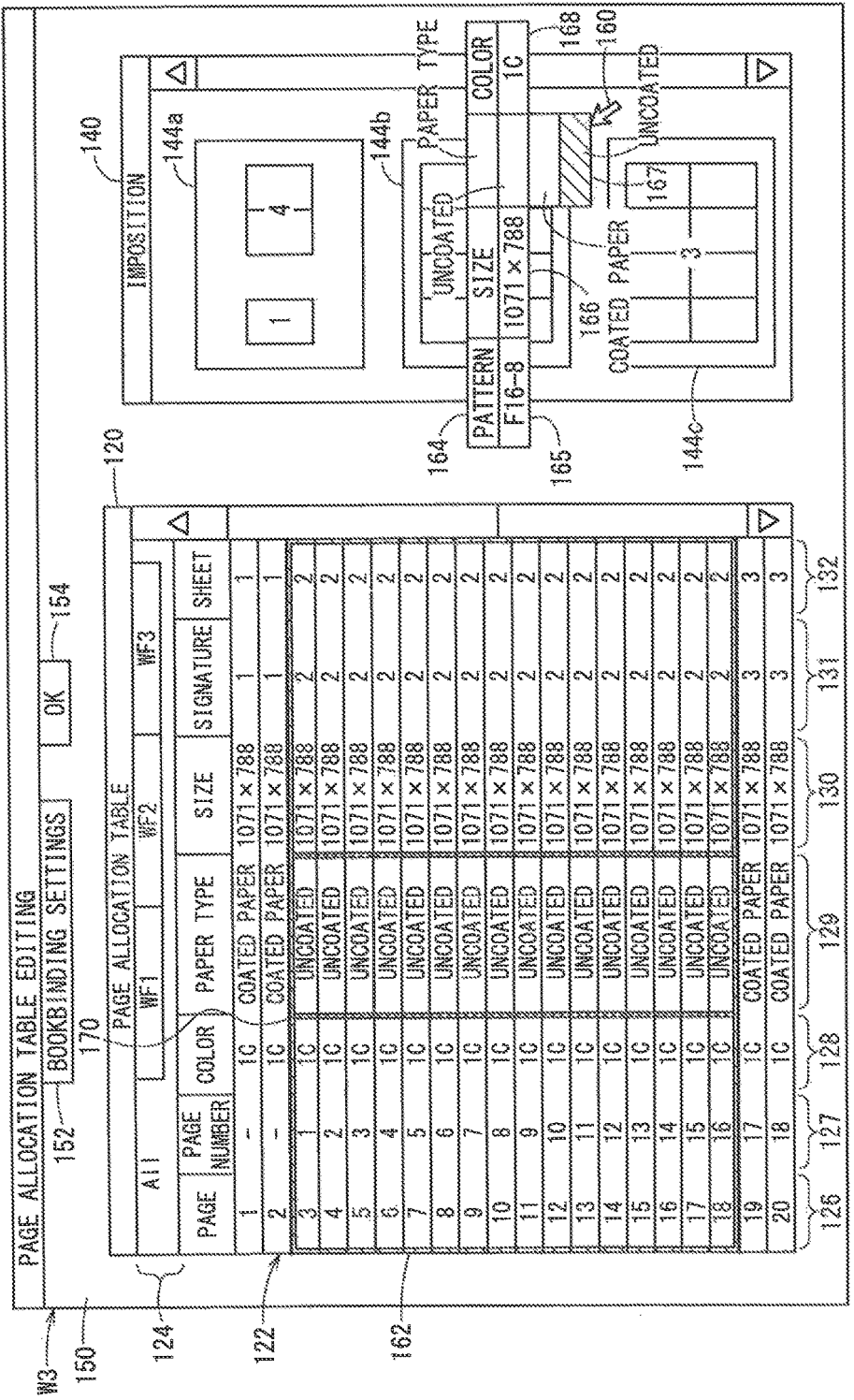
FIG. 10 is a second transition diagram of the page allocation table editing screen.

As shown in FIG. 10, the plotted content of the new page allocation table screen 120 and the new imposition screen 140 differ partially from the plotted content of the page allocation table screen 120 and the imposition screen 140 shown in FIG. 9. More specifically, the page allocation table image 122 of the page allocation table screen 120 includes a visually highlighted particular area 170 partially therein. The particular area 170 covers sixteen cells where the content of the items of the small field 129 have been changed to "UNCOATED". As a result, by viewing the page allocation table screen 120, the operator can grasp at a glance that the "PAPER TYPE" of "SHEET 2" has been changed.

Referring back to FIG. 9, the operator can change other imposition conditions (e.g., size) through the user interface 62. More specifically, using the user interface 62, it is assumed that the operator moves the cursor 160 to the position of the pull-down menu 166, and then drags the cursor 160 in order to select another size "636×469" (see FIG. 11), whereupon the screen generator 74 generates a new page allocation table screen 120 and a new imposition screen 140 (see FIG. 11).

Figure 11:
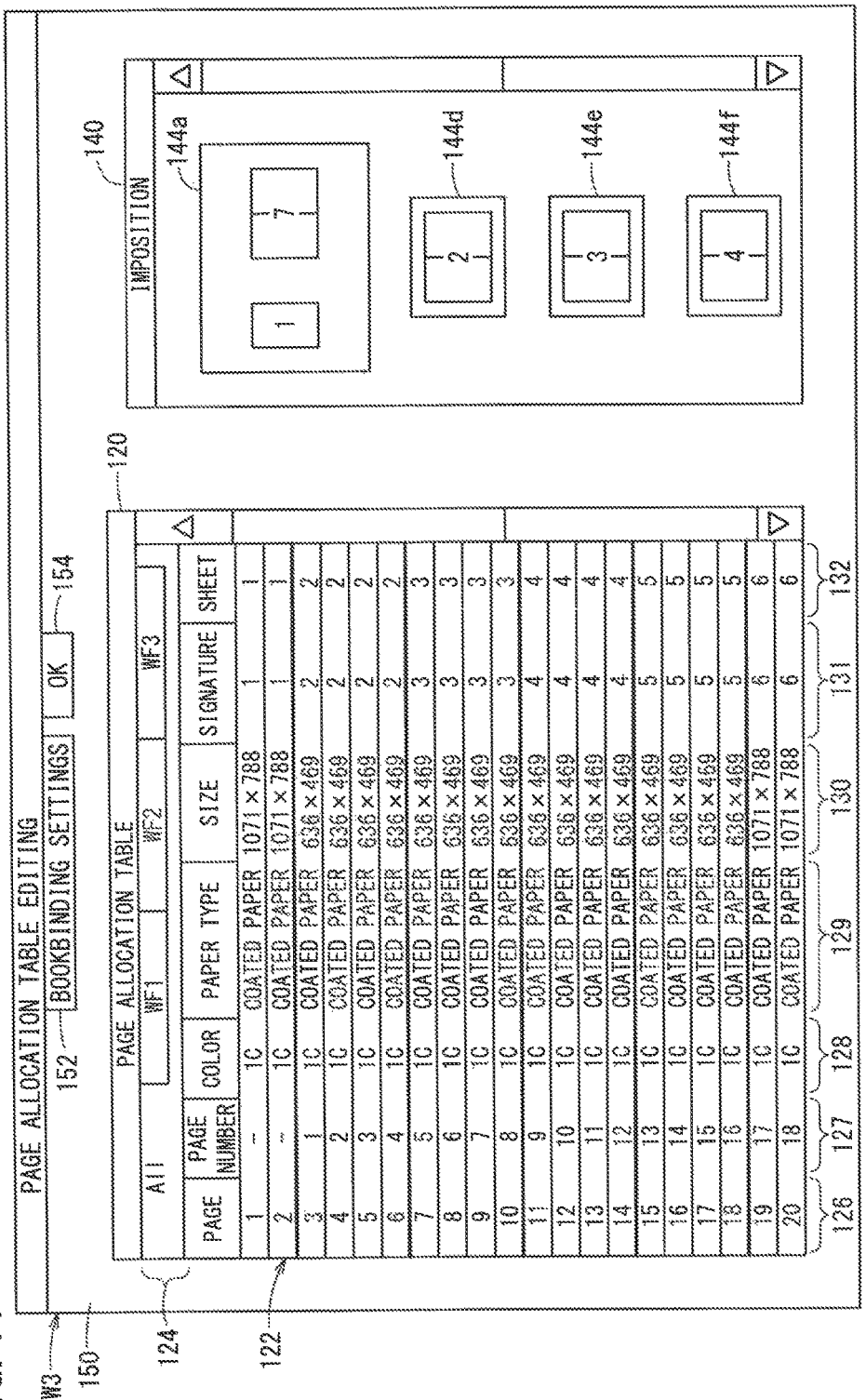
FIG. 11 is a third transition diagram of the page allocation table editing screen.

As shown in FIG. 11, the plotted content of the page allocation table screen 120 and the imposition screen 140 differ partially from the plotted content of the page allocation table screen 120 and the imposition screen 140 shown in FIG. 9. More specifically, the content of the items of the small fields 130 through 132 in the page allocation table image 122 of the page allocation table screen 120 are partially changed. Furthermore, the imposition screen 140 includes new auxiliary images 144d through 144f, each of which represents a 2-page imposition, instead of the auxiliary images 144b, 144c, each of which represents an 8-page imposition. Thus, the operator can grasp at a glance that an 8-page imposition on one sheet has been changed to a 2-page imposition on four sheets.

The operator can change the format of the page allocation table by way of the user interface 62. More specifically, it is assumed that the operator switches the tab 124, e.g., clicks on "WF2". In response thereto, the screen generator 74 generates a new page allocation table screen 120 (see FIG. 12), which simulates a page allocation table representing a subformat that is a subset of the overall format shown in FIGS. 8 through 11.

As shown in FIG. 12, the plotted content of the page allocation table screen 120 and the imposition screen 140 differ partially from the plotted content of the page allocation table screen 120 and the imposition screen 140 shown in FIG. 11. More specifically, the page allocation table image 122 of the page allocation table screen 120 is made up of pages that share three key items, i.e., "COLOR", "PAPER TYPE", and "SIZE". Thus, it is convenient for the operator to be capable of confirming the page allocation table in terms of work flow.

The subformat is not limited to the example shown in FIG. 12, but may be of any combination made up of various elements. For example, the screen generator 74 may generate a page allocation table screen 120 representing a subformat made up of at least two key items indicative of the type, weight, size, or thickness of the print medium 48, a color channel, or a type of parts.

In this manner, the operator generates and edits a page allocation table suitable for the print 40 while confirming the page allocation table editing screen 150. Assuming that the window W2 (FIG. 5) can be called up in response to a clicking action on the "BOOKBINDING SETTINGS" tab 152 (see FIGS. 8 through 12), the operator can reset the content of the bookbinding information 64.

If the screen generator 74 has received an instruction to change the plotted content of the imposition screen 140 that is displayed on the display unit 58 in response to a prescribed action taken by the operator, the screen generator 74 generates a new page allocation table screen 120 and a new imposition screen 140, which simultaneously reflect the change. Although not described in detail above, in a case where the operator changes the content of the items in the page allocation table screen 120 by way of the user control boxes, the screen generator 74 also generates a new page allocation table screen 120 and a new imposition screen 140, which simultaneously reflect the change.

Returning to step S6 of FIG. 3, if the controller 52 has received a clicking action for determining the content of the items of the page allocation table (step S6: YES), then control proceeds to the next step S9.

In step S9, the page allocation table generator 70 generates table data representing a page allocation table, by acquiring content of items in the page allocation table screen 120, which are displayed in response to the clicking action received in step S6. The page allocation table generator 70 stores and saves the generated table data as a page allocation table 66 in the memory 60. Thereafter, the sales department terminal apparatus 22 may send out the page allocation table 66 through the communication I/F 54, in order to maintain the page allocation table 66 in the order-receiving server 24 or the printing management server 36.

ADVANTAGES OF THE EMBODIMENT

As described above, the sales department terminal apparatus 22, which serves as the page allocation table determining apparatus according to the present embodiment, includes the bookbinding information acquirer 68 for acquiring bookbinding information 64 concerning the form of a bound book, the screen generator 74 for generating the page allocation table screen 120, which simulates a page allocation table having a format identified according to the bookbinding information 64, the imposition screen 140, which simulates a layout of imposed pages based on the page allocation table, and the display unit 58 for simultaneously displaying the page allocation table screen 120 and the imposition screen 140.

If the screen generator 74 receives a change, either in the content of items in the page allocation table screen 120, or in the plotted content of the imposition screen 140 in response to an action taken by the user, the screen generator 74 generates a page allocation table screen 120 and an imposition screen 140 that simultaneously reflect the change.

Since the sales department terminal apparatus 22 is configured as described above, by viewing the page allocation table and the layout of imposed pages at once, the user is capable of intuitively grasping a correlation between the page allocation table and the layout of imposed pages, and of sequentially grasping the change made in the page allocation table and the layout of imposed pages. Therefore, the user can be assisted in producing a page allocation table, even if the user is not skilled at handling page allocation tables.

Although the preferred embodiment of the present invention has been described in detail above, it should be understood that various changes and modifications may be made to the embodiment without departing from the scope of the invention as set forth in the appended claims.

What is claimed is:

1. A page allocation table determining apparatus comprising:
   at least one processing unit configured as a bookbinding information acquirer to acquire bookbinding information concerning a form of a bound book;
   the at least one processing unit further configured as a screen generator to generate a page allocation table screen, which simulates a page allocation table having a format identified according to the bookbinding information acquired by the bookbinding information acquirer, and an imposition screen, which simulates a layout of imposed pages based on the page allocation table; and
   a display unit for simultaneously displaying the page allocation table screen and the imposition screen that are generated by the screen generator,
   wherein, if the screen generator receives a change in a plotted content of the imposition screen displayed by the display unit along with the page allocation table screen, the screen generator generates a new page allocation table screen and a new imposition screen that simultaneously reflect the change, wherein the page allocation table determining apparatus is connectively coupled with a printing server for performing raster image processing on imposed platemaking data via a first LAN and an independently administered second LAN, and
   wherein the screen generator generates a page allocation table screen, which simulates a page allocation table representing a subformat that is a subset of the format,
   wherein the screen generator generates the new page allocation table screen and the new imposition screen in response to an action taken by a user on a menu box displayed within the imposition screen in an overlaying manner on the plotted content of the imposition screen to be changed, and
   wherein the imposed platemaking data correspond to image formation using at least one of a printing plate and a digital printer.

2. The page allocation table determining apparatus according to claim 1, wherein the screen generator generates the page allocation table screen representing the subformat made up of at least two key items indicating type, weight, size, or thickness of a print medium, a color channel, or a type of parts.

3. The page allocation table determining apparatus according to claim 1, further comprising:
   a page allocation table generator for acquiring the content of items displayed by the display unit, and generating table data representing the page allocation table.

4. A page allocation table determining method for enabling the page allocation table determining apparatus according to claim 1, said method using a processor to perform the steps of:
   acquiring bookbinding information concerning a form of a bound book;
   generating a page allocation table screen, which simulates a page allocation table having a format identified according to the acquired bookbinding information, and an imposition screen, which simulates a layout of imposed pages based on the page allocation table; and simultaneously displaying the page allocation table screen and the imposition screen that are generated, wherein, in the step of generating, if a change is received in a plotted content of the displayed imposition screen along with the page allocation table screen, a new page allocation table screen and a new imposition screen are generated that simultaneously reflect the change, wherein the page allocation table determining apparatus is connectively coupled with a printing server for performing raster image processing on imposed platemaking data via a first LAN and an independently administered second LAN, and wherein generating the page allocation table screen includes simulating a page allocation table representing a subformat that is a subset of the format, wherein the screen generating includes generating the new page allocation table screen and the new imposition screen in response to an action taken by a user on a menu box displayed within the imposition screen in an overlaying manner on the plotted content of the imposition screen to be changed, and wherein the imposed platemaking data correspond to image formation using at least one of a printing plate and a digital printer.

5. A non-transitory storage medium in which a page allocation table determining program is stored for enabling the page application table determining apparatus according to claim 1 to perform the steps of:

acquiring bookbinding information concerning a form of a bound book;

generating a page allocation table screen, which simulates a page allocation table having a format identified according to the acquired bookbinding information, and an imposition screen, which simulates a layout of imposed pages based on the page allocation table; and simultaneously displaying the page allocation table screen and the imposition screen that are generated, wherein, in the step of generating, if a change is received in a plotted content of the displayed imposition screen along with the page allocation table screen, a new page allocation table screen and a new imposition screen are generated that simultaneously reflect the change, wherein the page allocation table determining apparatus is connectively coupled with a printing server for performing raster image processing on imposed platemaking data via a first LAN and an independently administered second LAN, and wherein generating the page allocation table screen includes simulating a page allocation table representing a subformat that is a subset of the format, wherein the screen generating includes generating the new page allocation table screen and the new imposition screen in response to an action taken by a user on a menu box displayed within the imposition screen in an overlaying manner on the plotted content of the imposition screen to be changed, and wherein the imposed platemaking data correspond to image formation using at least one of a printing plate and a digital printer.

* * * * *